United States Patent
Bono et al.

(10) Patent No.: US 9,645,932 B1
(45) Date of Patent: May 9, 2017

(54) PERSISTENT METADATA CACHE

(71) Applicant: EMC Corporation, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 14/576,931

(22) Filed: Dec. 19, 2014

(51) Int. Cl.
*G06F 12/08* (2016.01)
*G06F 12/0831* (2016.01)
*G06F 3/06* (2006.01)

(52) U.S. Cl.
CPC ........ *G06F 12/0833* (2013.01); *G06F 3/0619* (2013.01); *G06F 3/0643* (2013.01); *G06F 3/0688* (2013.01); *G06F 3/0689* (2013.01); *G06F 2212/62* (2013.01)

(58) Field of Classification Search
CPC .. G06F 12/0833; G06F 3/0619; G06F 3/0643; G06F 3/0688; G06F 3/0689
USPC ........ 711/102, 105, 112, 114, 135, 156, 200, 711/209, 220; 707/825; 713/300, 320, 713/324; 714/4.11, 6.3, 10
See application file for complete search history.

(56) References Cited

U.S. PATENT DOCUMENTS

| | | | |
|---|---|---|---|
| 7,533,215 B2 * | 5/2009 | Faber | G06F 9/4418 707/999.001 |
| 8,347,041 B2 * | 1/2013 | Banerjee | G06F 12/0866 711/143 |
| 8,661,068 B1 | 2/2014 | Seibel et al. | |
| 8,719,520 B1 * | 5/2014 | Piszczek | G06F 11/1076 709/219 |
| 9,020,987 B1 * | 4/2015 | Nanda | G06F 3/06 707/821 |
| 9,032,151 B2 * | 5/2015 | Iyigun | G06F 11/1441 711/113 |
| 9,069,682 B1 | 6/2015 | Veeraswamy | |
| 9,122,589 B1 | 9/2015 | Bono et al. | |
| 9,135,123 B1 * | 9/2015 | Armangau | G06F 11/1471 |
| 9,146,928 B1 | 9/2015 | Noveck | |
| 9,213,717 B1 * | 12/2015 | Pawar | G06F 17/30171 |
| 9,268,502 B2 * | 2/2016 | Zheng | G06F 17/30327 |
| 9,280,578 B1 | 3/2016 | Zhou et al. | |
| 9,286,007 B1 | 3/2016 | Bono | |
| 9,311,333 B1 * | 4/2016 | Pawar | G06F 17/30227 |
| 9,361,306 B1 * | 6/2016 | Pawar | G06F 17/30168 |
| 9,442,955 B1 * | 9/2016 | Pawar | G06F 17/30227 |
| 9,460,177 B1 * | 10/2016 | Pawar | G06F 17/30575 |
| 9,535,801 B1 * | 1/2017 | Natanzon | G06F 11/1471 |
| 9,542,396 B1 * | 1/2017 | Pawar | G06F 17/3007 |
| 2013/0054869 A1 * | 2/2013 | Tolia | G06F 12/0871 711/102 |
| 2013/0185475 A1 * | 7/2013 | Talagala | G06F 12/0866 711/102 |

(Continued)

*Primary Examiner* — Stephen Elmore
(74) *Attorney, Agent, or Firm* — BainwoodHuang

(57) ABSTRACT

A technique for storing metadata changes includes caching metadata changes in a persistent metadata cache. The persistent metadata cache is configured to cache metadata reads and writes directed to a set of internal volumes of the data storage system. A file system can access pages of the persistent metadata cache by specifying an identifier of an internal volume and an offset into that volume to which the metadata changes are directed.

20 Claims, 5 Drawing Sheets

(56) References Cited

U.S. PATENT DOCUMENTS

| 2015/0279463 A1* | 10/2015 | Berke | G11C 5/04 |
| | | | 711/105 |
| 2016/0011984 A1* | 1/2016 | Speer | G06F 12/0891 |
| | | | 711/102 |
| 2016/0062856 A1* | 3/2016 | Mu | G06F 11/2092 |
| | | | 714/4.12 |

* cited by examiner

PERSISTENT METADATA CACHE

BACKGROUND

Data storage systems are arrangements of hardware and software that may include multiple storage processors coupled to arrays of non-volatile storage devices. In typical operation, the storage processors service storage requests that arrive from hosts. The storage requests specify files or other data elements to be written, read, created, or deleted, for example. The storage processors each run software that manages incoming storage requests and performs various data processing tasks to organize and secure user data stored on the non-volatile storage devices.

It is common for data storage systems to include various caches and transaction logs to facilitate metadata processing. For example, a data storage system may employ a system cache for storing file system metadata to be written to or read from storage volumes, e.g., to access frequently-used metadata without having to perform a disk access each time the metadata are needed. A data storage system may also employ buffer caches for holding file system metadata in high-speed memory. Buffer caches may be backed by a transaction log. As is known, a transaction log is a non-volatile intent log for temporarily persisting pending metadata changes. A transaction log may be implemented, for example, as a circular buffer of limited size on one or more flash drives. A file system may quickly and persistently store pending metadata changes in the transaction log to keep pace with incoming IO (input/output) requests from hosts. As resources permit, and generally out of band with IO requests, the data storage system may sync the metadata changes stored in the transaction log to storage volumes, e.g., by writing the metadata changes to system cache, which may then flush the changes to underlying disk drives.

Transaction logs also help to maintain consistency in the event of a failure. For example, if a storage processor running on a data storage system experiences a failure after writing pending metadata changes to a transaction log, the file system can replay the transactions upon recovery to fix the pending changes in the file system's nonvolatile metadata structures, e.g., by writing them to system cache and flushing them to disk. Thus, no metadata changes are lost, and the file system remains consistent even after the failure.

SUMMARY

Unfortunately, the use of caches and transaction logs in a data storage system often involves redundant operations that consume system resources. For example, to read a piece of metadata from a storage volume, a file system may allocate a buffer cache for the metadata and request its current value from system cache. The system cache may respond by copying the metadata to the newly-allocated buffer cache, fetching its contents from the storage volume first if they are not already present in the system cache. Thus, this simple operation, which may be repeated by a data storage system on a nearly continual basis, involves numerous operations that end up caching the same metadata twice, i.e., once in the system cache and again in the buffer cache. In a similar manner, operating a transaction log entails numerous activities, such as writing to the log, managing the log, and syncing the log. The transaction log also makes redundant use of storage, as the metadata changes it stores are eventually copied (synced) to underlying volumes.

Further, caches and transaction logs commonly address file system metadata based on file system location (e.g., File System Block Number, or "FSBN"). Thus, when it comes time to flush metadata changes to underlying storage volumes, the system cache performs an address translation to map the file system addresses to corresponding storage volume addresses. Such address translations consume system resources, and a data storage system may need to repeat them continually as metadata flow between system cache and underlying storage volumes.

In contrast with conventional designs, which make inefficient use of resources when storing file system metadata, an improved technique for storing metadata changes includes caching metadata changes in a persistent metadata cache. The persistent metadata cache is configured to cache metadata reads and writes directed to a set of internal volumes of the data storage system. A file system can access pages of the persistent metadata cache by specifying an identifier of an internal volume and an offset into that volume to which the metadata changes are directed. Thus, for example, the persistent metadata cache provides the file system with persistent caching services without needing to copy metadata between different caches. Further, in some examples, the persistent metadata cache avoids the need for performing address translation when flushing metadata to internal volumes. As the persistent metadata cache may be addressed using the same addressing scheme as is used for internal volumes, flushing from persistent metadata cache to underlying volumes often requires no additional mapping. The persistent metadata cache thus reduces the number of operations required to accomplish routine metadata processing tasks and makes better use of data storage system resources.

In some examples, a file system can read and write to the persistent metadata cache for performing routine metadata processing tasks. Thus, the need for separate buffer caches is reduced or eliminated.

In some examples, the file system writes metadata changes to the persistent metadata cache in an atomic manner, such that metadata changes relating to a single file system transaction are either all cached together successfully or not at all. By caching metadata atomically, the persistent metadata cache fulfills the role of a transaction log, thus reducing or avoiding any need for a separate transaction log. The persistent metadata cache, or any portion thereof, may be flushed to storage via the set of internal volume as part of normal cache processing. Thus, there is no need to separately sync metadata transactions to storage, as this happens naturally as part of the normal course of managing the persistent metadata cache as a read/write cache for the set of internal volumes.

In some examples, the persistent metadata cache resides on a first storage processor (SP) of the data storage system and the data storage system mirrors the contents of the persistent metadata cache to a similar persistent metadata cache on a second storage processor, such that the persistent metadata cache on each SP stores the same metadata changes. In the event of a trespass or failover from the first SP to the second SP, the second SP can resume operations with no risk of metadata loss, as the metadata cached on the first SP is already present on the second SP.

Certain embodiments are directed to a method of storing metadata in a data storage system. The method includes receiving, by a data storage system, IO (input/output) requests specifying data to be written to a file system of the data storage system, the file system backed by a set of internal volumes that support non-volatile storage of multiple metadata structures of the file system. The method further includes computing a set of metadata changes to be applied to the file system for incorporating a set of the data specified in the IO requests into the file system. The method still further includes performing a caching operation to store the set of metadata changes in a persistent metadata cache, the persistent metadata cache constructed and arranged to cache metadata reads and writes directed to the set of internal volumes, the caching operation including writing the set of metadata changes to pages of the persistent metadata cache using an addressing scheme that addresses pages by identifier of an internal volume and offset into the internal volume.

Other embodiments are directed to a data storage apparatus constructed and arranged to perform the method of storing metadata in a data storage system, such as the one described above. Still other embodiments are directed to a computer program product. The computer program product stores instructions which, when executed on one or more processing units of a data storage apparatus, cause the data storage apparatus to perform a method of storing metadata in a data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for storing metadata changes in a data storage system includes caching metadata changes in a persistent metadata cache. The persistent metadata cache is configured to cache metadata reads and writes directed to a set of internal volumes of the data storage system. A file system can access pages of the persistent metadata cache by specifying an identifier of an internal volume and an offset into that volume to which the metadata changes are directed. The persistent metadata cache thus reduces the number of operations required to accomplish routine metadata processing tasks and makes better use of data storage system resources.

Figure 1:
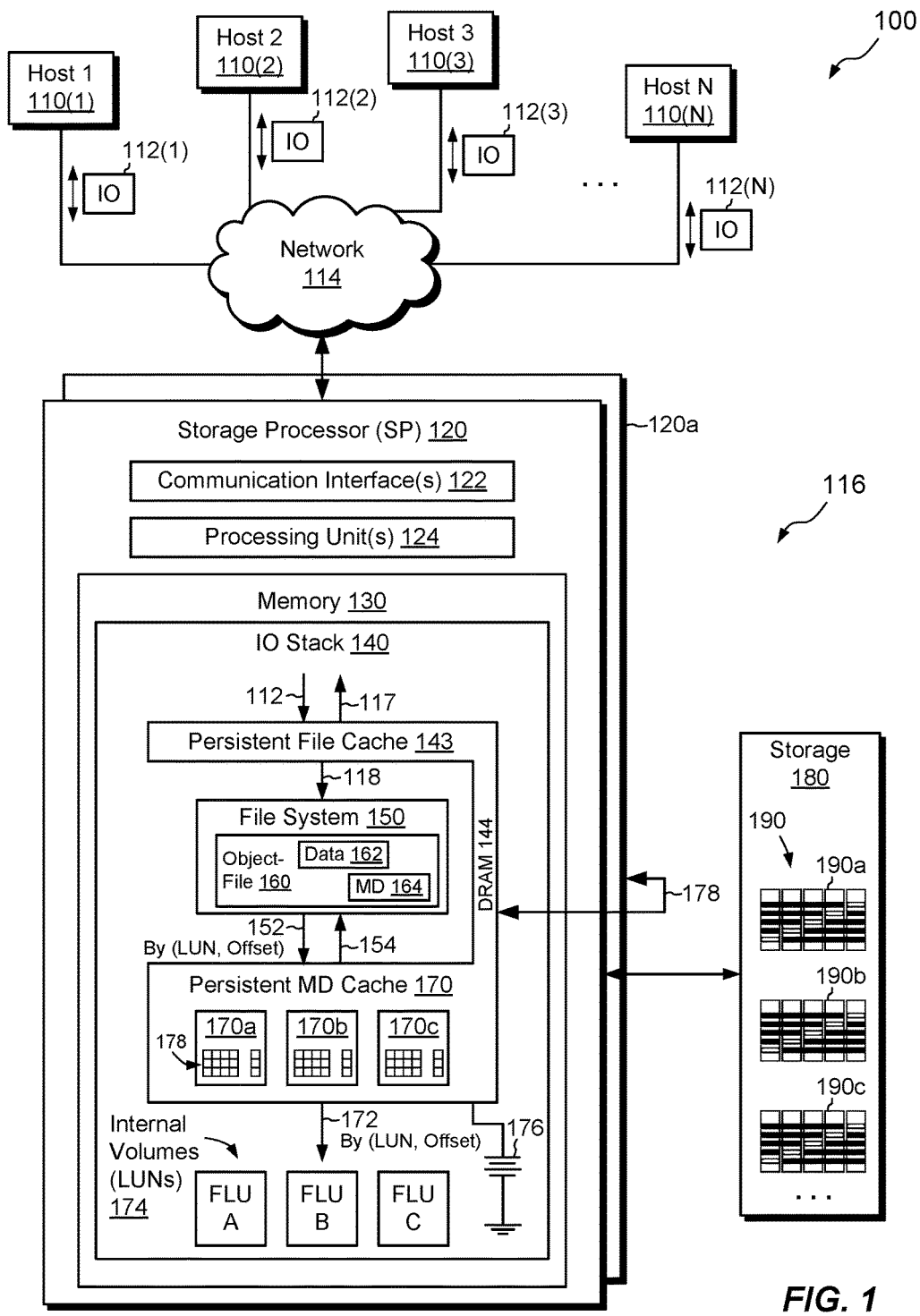
FIG. 1 is a block diagram showing an example environment in which techniques hereof can be practiced, wherein the environment includes a data storage system having storage processors, multiple RAID groups for storing data, and a persistent metadata cache for facilitating storage of file system metadata.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 includes RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. Each of the RAID groups 190 may store redundant data in the form of parity segments. In the event that a disk drive in a RAID group fails, the RAID group can reconstruct content from the damaged drive by applying data from undamaged drives and the parity segments.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140. The IO stack 140 provides an execution path for host IOs (e.g., IO requests 112(1-N)). It can be seen that the IO stack 140 includes a persistent file cache 143, a file system 150, a persistent metadata cache 170, and internal volumes 174, e.g., in the form of FLU A, FLU B, and FLU C.

The term "FLU" is an acronym for "Flare LUN," with "LUN" being an acronym for "logical unit number," a term that refers not only to an identifying number (i.e., a unit number) but also to the volume itself. Here, a FLU is a logical representation of a set of the RAID groups 190, such as one RAID group, for example. In the example shown, FLU A provides a logical representation of RAID group 190a, FLU B provides a logical representation of RAID group 190b, and FLU C provides a logical representation of RAID group 190c. The data storage system 116 may include any number of RAID groups 190, and the IO stack 140 may provide any number of FLUs to support them.

Each FLU has an addressing scheme that the persistent metadata cache 170 can use to access blocks of the respective RAID group. The addressing scheme for a FLU is based on LUN (unit number) and offset into the LUN. For instance, each FLU expresses its underlying RAID group as a range of contiguous blocks, such that any block within a RAID group can be accessed by specifying an offset into that FLU. The offset represents a block number relative to a starting point of the FLU. A "block" is the smallest allocatable unit of storage, which may be 8 KB in size, although blocks may be provided in any suitable denomination. Although the data storage system 116 shows the storage volumes 174 as FLUs, it should be understood that the storage volumes 174 are not required to be FLUs, but may be any logical representation of storage in which blocks are addressed using a volume identifier and an offset.

As further shown in FIG. 1, the persistent metadata cache 170 includes addressable sections 170a, 170b, and 170c, one for each of the FLUs. Each addressable section performs read and write caching for a respective FLU. Thus, for example, section 170a performs caching for FLU A, section 170b performs caching for FLU B, and section 170c performs caching for FLU C. Cache pages 178 in the persistent metadata cache 170 are themselves accessible using the same addressing scheme as was described above for blocks in the internal volumes 174, i.e., by specifying a LUN and an offset into the LUN. Thus, for example, the file system 150 can write to pages 178 in the persistent metadata cache 170 using the same addressing scheme that the persistent metadata cache 170 uses to write to blocks in the FLUs.

It can be seen from the example of FIG. 1 that the persistent metadata cache 170 has a connection to the persistent file cache 143. As will be described, the persistent file cache 143 may in some examples share memory space with the persistent metadata cache 170. Also, the persistent file cache 143 and the persistent metadata cache 170 may both be part of a unified system cache.

In the particular example shown, the persistent file cache 143 and the persistent metadata cache 170 are implemented in DRAM (Dynamic Random Access Memory) 144. Although DRAM 144 is normally regarded as volatile memory, and hence non-persistent, persistence of the DRAM 144 and the caches 142 and 170 that the DRAM supports are achieved through the use of batteries 176. The batteries 176 provide backup power in the event of a power loss and thus enable the DRAM 144 to hold their contents in place until power can be restored. Although other portions of the data storage system 116 may lose power and become inoperative, the persistent file cache 143 and the persistent metadata cache 170 continue to function.

In an example, the SP 120a is constructed similarly to the SP 120, such that the SP 120a has its own persistent file cache 143 and its own persistent metadata cache 170, e.g., implemented in DRAM and backed up by battery 176. To provide further protection, as well as other advantages, the data storage system 116 mirrors the contents of DRAM 144 on the SP 120 to the DRAM on the SP 120a, e.g., via connection 178. The converse may be the case as well, with the contents of DRAM 144 on the SP 120a mirrored over connection 178 to the DRAM on SP 120. Thus, not only are the persistent file cache 143 and the persistent metadata cache 170 backed up by battery 176 on each SP, but also they are mirrored to the other SP, where they are also backed by battery. Of course, the data storage system 116 may include greater than two SPs, and mirroring of caches may be performed over any number of them. In an example the connection 178 over which mirroring takes place includes a PCI Express cable directly connecting the two SPs.

It should be understood that battery-backed DRAM is merely one example implementation for achieving persistence in the persistent file cache 143 and in the persistent metadata cache 170. For example, various high-speed, persistent memory technologies are currently being developed. It is expected that the battery-backed DRAM used in the illustrated embodiments may be replaced over time with high-speed, persistent storage, which does not require battery backup to achieve its persistence. Such new storage technologies, once they become available, could easily be swapped into the embodiments presented here, to provide even more efficient solutions. Such replacements are considered to fall within the scope of the invention hereof.

With further reference to FIG. 1, it is seen that the file system 150 includes an object-file 160. In an example, the object-file 160 is a container file that provides a file-based realization of a host-accessible data object, such as a host LUN, a host file system, a VVol (virtual volume, available from VMware, Inc. of Palo Alto, Calif.), or some other data object, for example. Mapping within the IO stack 140 converts IO requests 112, which are directed to a host-accessible object, to a corresponding set of reads and writes, which are directed to the object-file 160. The file system 150 organizes both data 162 and metadata 164 of the object-file 160, e.g., by maintaining blocks of data 162 and metadata 164 in a physical address space of the file system 150. In an example, the physical address space is organized by FSBN (file system block number), although other file system addressing schemes may be used. The data 162 of the object-file 160 includes file data, whereas the metadata 164 includes file system metadata required to support the object-file 160. Such metadata may include an inode, indirect blocks (IBs) for pointing to data blocks in which the data 162 are stored, per-block metadata (BMDs) for describing both data blocks and metadata blocks, virtual block maps (VBMs, assuming VBMs are deployed), and/or other metadata, for example.

In example operation, one or more of the hosts 110(1-N) issues IO requests 112, e.g., any of requests 112(1-N), to the data storage system 116. The IO requests 112 are directed to a host-accessible data object, such as a host LUN, host file system, a VVol, or some other object. The SP 120 receives the IO requests 112 at the communication interfaces 122 and passes the IO requests to the IO stack 140 for further processing. The IO requests 112 include requests specifying data to be written to the host-accessible data object. For each such IO request, the persistent file cache 143 caches the data specified in the IO request. The persistent file cache 143 also provides an acknowledgment 117 once the data specified in the IO request have been securely stored, e.g., once they have been saved to battery-backed DRAM on SP 120 and successfully mirrored to battery-backed DRAM on SP 120a. The acknowledgement 117, which indicates successful completion of the IO request 112, propagates back to the originating host, e.g., back to one of the hosts 110(1) to 110(N). The above process may be repeated for additional IO requests 112 specifying additional data to be written to various locations in the data object. The persistent file cache 143 accumulates the data specified in these IO requests 112, e.g., in the order received, and provides a respective acknowledgement 117 in response to each one.

At some point in the course of accumulating data from IO requests 112, and generally out of band with the processing of particular IO requests 112, the persistent file cache 143 performs a flushing operation 118 to send the accumulated data, or portions thereof, to the file system 150, i.e., for organizing and incorporating the specified data into the data 162 of the object-file 160. The file system 150 also computes changes in the object-file's metadata 164 needed to incorporate the data 162 into the file system's structure. These metadata changes may encompass a wide range of possibilities, such as, for example, allocating blocks, freeing blocks, changing block pointers (e.g., within IB blocks), changing the mapped block count in the object-file's inode, updating bitmaps, and so forth.

In an example, the file system 150 aggregates different metadata changes into distinct transactions, where each transaction specifies all of the metadata changes needed to bring about a consistent change in the state of the file system 150. The process for consistently aggregating metadata changes may be similar to the one commonly used when committing metadata changes from a transaction log, i.e., the file system 150 groups together changes that must be effected all together as one or not at all—i.e., atomically.

For each set of metadata changes that must be made together to maintain file system consistency, the file system 150 identifies a corresponding group of blocks in the file system 150 that must be written to put the set of metadata changes into effect. Each block of the group of blocks has an associated FSBN in the file system's physical address space. For block each of the group of blocks, the file system 150 computes, or otherwise obtains, a corresponding page address in the persistent metadata cache 170 at which to cache the contents of the respective block. As indicated above, the addressing scheme for cache pages 178 takes the form of FLU and offset, just as the addressing scheme for blocks in a FLU takes the form of FLU and offset. Once the file system 150 maps an FSBN to a FLU address, the file system 150 may store the mapping information, e.g., in a local cache (not shown), such that mapping again is not required the next time access to the same metadata block is desired.

Once the file system 150 has mapped FSBNs to FLU addresses for each of the group of blocks that must be changed together to effect a consistent change in the file system's metadata state, the file system 150 may perform a caching operation 152. For example, the file system 150 makes a call into an API (application program interface) of the persistent metadata cache 170. The API call specifies the FLU address of each cache page to be written and directs the persistent metadata cache 170 to cache the contents of the group of blocks atomically. The persistent metadata cache 170 then performs the requested caching operation, atomically writing block contents to corresponding cache pages 178 all together or none at all.

Once the caching operation 152 in the persistent metadata cache 170 completes successfully, or fails completely (i.e., atomically), the persistent metadata cache 170 provides an acknowledgement 154, informing the file system 150 whether the caching operation 152 succeeded or failed. In some examples, the persistent metadata cache 170 only acknowledges successful completion of the caching operation 152 once all cache pages 178 required to be written atomically have been stored both in the persistent metadata cache 170 on the SP 120 and in the persistent metadata cache 170 on the SP 120a.

The file system 150 repeats the above-described acts of grouping together metadata changes into those that must be performed together, identifying blocks in the file system 150 that store metadata to be changed, computing or obtaining from local cache FLU addresses for the identified blocks, and performing caching operations 152 to write to pages in the persistent metadata cache 170. These acts continue to be repeated as new IO requests 112 are received and metadata changes continue to accrue.

Over time, and in the course of managing the persistent metadata cache 170, the persistent metadata cache 170 flushes pages 178 to the FLUs. For example, the persistent metadata cache 170 performs a flushing operation 172, in which it sends the contents of a cache page to an underlying FLU using the same address that the file system 150 used to write to the page in the persistent metadata cache 170. For example, if the file system 150 previously cached the contents of a metadata block to a page at address "FLU B, offset 9F3A" in the persistent metadata cache 170, then the persistent metadata cache 170, when flushing the page, would direct that page to the same address, i.e., to "FLU B, offset 9F3A," such that the contents of the page would be written to a block in FLU B. No additional address translation is required. Writing the page to FLU B effects a write to the RAID group 190b, thus fixing the contents of the page in non-volatile memory.

It should be understood that metadata changes stored in the persistent metadata cache 170 may remain in pages 178 for an arbitrary amount of time. For example, a caching policy may keep pages 178 in cache 170 for longer periods if they are frequently accessed and for shorter periods if they are rarely accessed.

In an example, the size of pages 178 in the persistent metadata cache 170 is 8 KB, i.e., the same as the size of blocks in the file system 150. This arrangement further promotes efficiency, as there is a one-to-one mapping between file system blocks and cache pages 178. One-to-one mapping is not required, however.

The persistent metadata cache 170 simplifies and streamlines metadata processing. Because it is readily accessible to the file system 150 over an API, the persistent metadata cache 170 reduces or eliminates the need for metadata buffer caches. As buffer caches are no longer required, redundant copies of metadata between buffer caches and system cache are avoided. The persistent metadata cache 170 also reduces or eliminates the need for a metadata transaction log. Rather than writing metadata transactions to a transaction log, which later has to be synced to storage, the file system 150 can instead write transactions directly and atomically to the persistent metadata cache 170. The persistent metadata cache 170 safely stores the metadata transactions, even in the event of a power failure or system panic. No syncing or replay is required, as the persistent metadata cache 170 preserves metadata changes as part of its normal process of flushing pages to FLUs.

In some embodiments, the caching operation 152 to the persistent metadata cache 170 is not only performed Atomically [sic], but also so as to promote Consistency, Isolation, and Durability. Such "ACID" transactions further promote the effectiveness of the persistent metadata cache 170 in serving as a replacement for the conventional transaction log.

Figure 2:
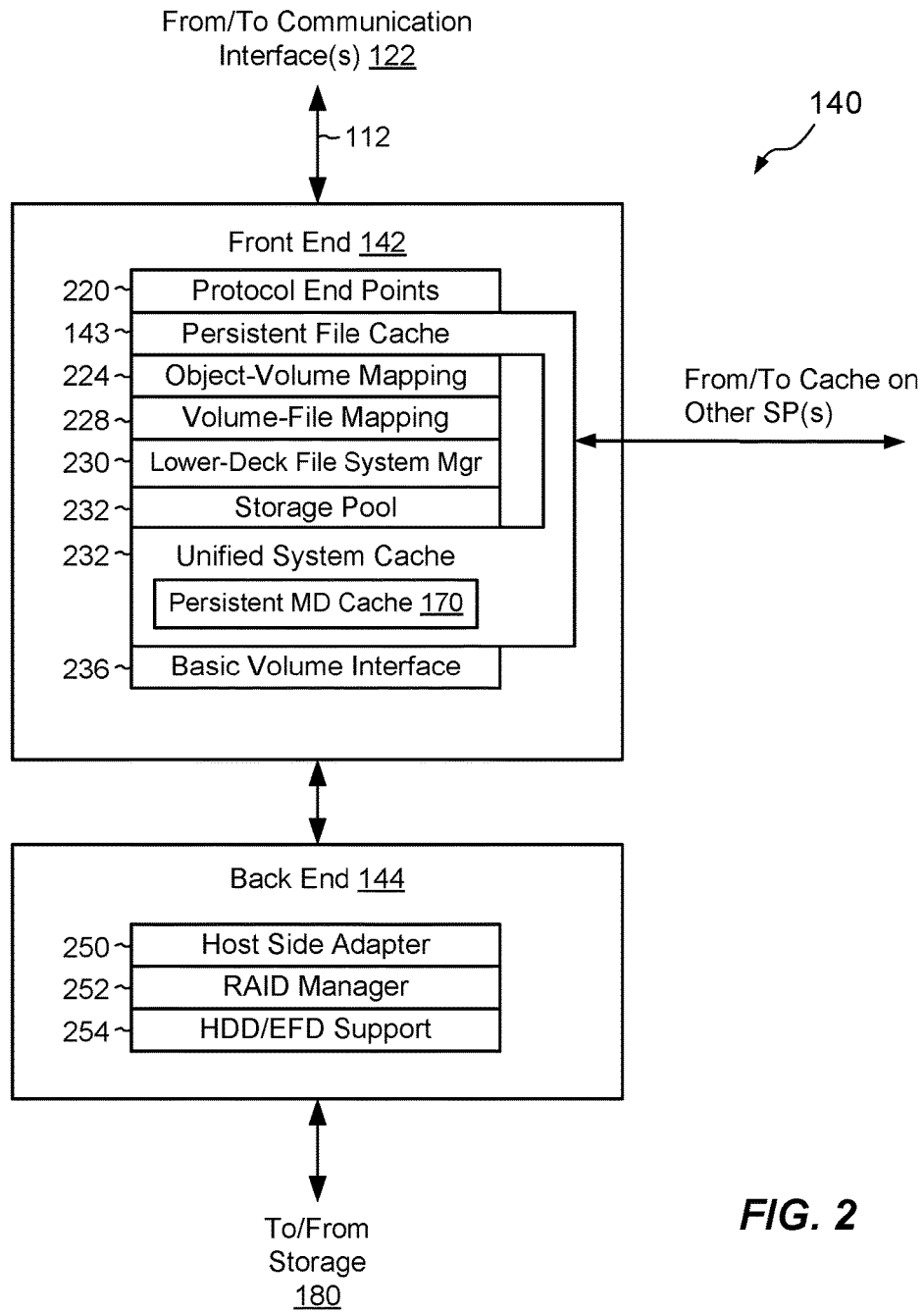
FIG. 2 is a block diagram showing an example IO stack of a storage processor of FIG. 1 in additional detail.

FIG. 2 shows the example IO stack 140 of FIG. 1 in additional detail. Here, the IO stack 140 is seen to include a front end 142 and a back end 144. The front end 142 and back end 144 may be operated together on the same SP, as they are in FIG. 1, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include protocol end points 220, the persistent file cache 143, an object-volume mapping layer 224, a volume-file mapping 228, a lower-deck (internal) file system manager 230, a storage pool 232, the persistent metadata cache 170, and a basic volume interface 236.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 234 provides caching services for underlying RAID groups 190. In an example, the unified system cache 234 includes the above-described persistent metadata cache 170, e.g., as a separately managed cache portion, just as it includes the persistent file cache 143 as a separately managed cache portion.

The storage pool 232 organizes elements of the storage 180 in the form of slices. A "slice" is an increment of storage space, such as 256 MB or 1 GB in size, which is composed from a portion of a FLU (e.g., of a RAID group). The pool 232 may allocate slices to lower-deck file systems to support the storage of data objects. The pool 232 may also deallocate slices from lower-deck file systems if storage provided by the slices is no longer required.

The lower-deck file system manager 230 builds and manages internal, lower-deck file systems (like the file system 150) upon slices served by the storage pool 232. Lower-deck file systems can realize both block-based objects and file-based objects in the form of files (container files, e.g., like the object-file 160). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, may include other files that realize snaps of the file that stores the data object. Some implementations allow for storing additional files. Each of the lower-deck file systems has an inode table. The inode table provides a different inode for each file stored in the respective lower-deck file system. Each inode stores properties of a respective file, such as its ownership, and includes and/or points to block pointers that map logical addresses of the file to physical addresses of blocks that store the file's data. As already stated, a "block" is the smallest allocatable unit of storage, which may be, for example, 8 KB in size. Blocks may be of sizes different from 8 KB, however, and a data storage system may use blocks of different sizes for storing different types of data and/or metadata.

The volume-file mapping 228 maps each file representing a data object to a respective internal LUN, or volume. Higher levels of the IO stack 140 can then access the internal LUN using block-based semantics. The volume-file mapping can be achieved in a variety of ways. According to one example, a file representing a data object is regarded as a range of blocks, and the range of blocks can be expressed as a corresponding range of offsets into the file. Because LUNs are accessed based on starting location (logical unit number) and offsets, the volume-file mapping 228 can establish a one-to-one correspondence between offsets into the file and offsets into the corresponding internal LUN, thereby providing the requisite mapping needed to express the file in the form of a LUN.

The object-volume mapping layer 224 maps internal LUNs to respective data objects accessible to hosts, such as host LUNs, host file systems, and VVols, for example. For host LUNs, object-volume mapping may involve a simple remapping from a format compatible with the internal LUN to a format compatible with the host LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal LUNs presented by the volume-file mapping 228 to provide hosts with access to files and directories. Mapping of VVols can be achieved in similar ways. For block-based VVols, the object-volume mapping layer 224 may perform mapping substantially as it does for host LUNs. For file-based vVOLs, the object-volume mapping layer 224 may perform mapping by converting host-specified offsets into VVol files to corresponding offsets into internal LUNs.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
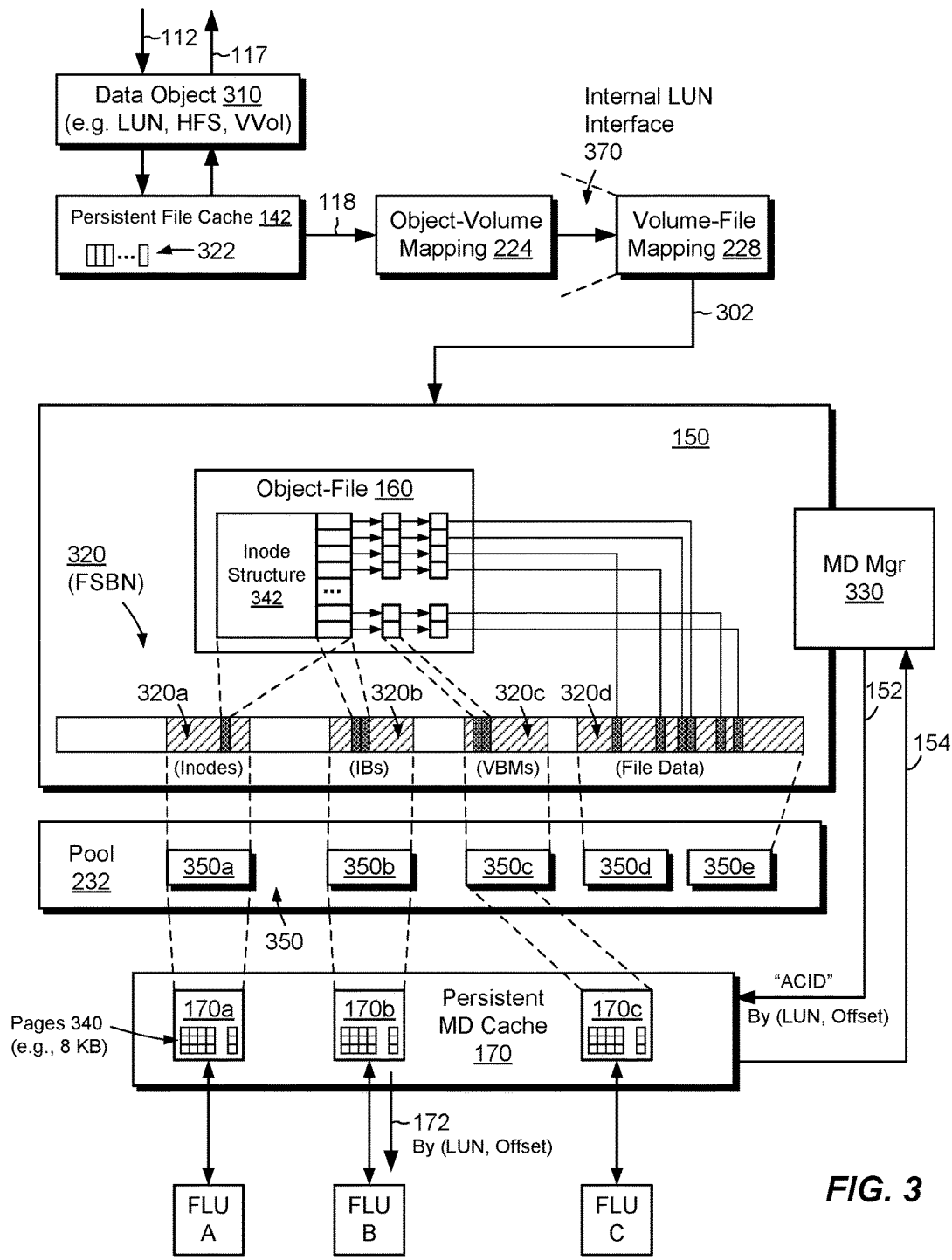
FIG. 3 is a block diagram showing example features of the IO stack of FIG. 2 in further detail, including a file system organizing blocks by FSBN and a persistent metadata cache organizing pages by storage volume and offset.

FIG. 3 shows portions of the front end 142 in additional detail. Here, data object 310 represents a host-accessible object, such as a LUN, a host file system (HFS), or a VVol, for example. Persistent file cache 143 stores data 322 specified in IO requests 112. Object-volume mapping 224 and volume-file mapping 228 (also FIG. 2) convert the IO requests 112, which specify writes to the data object 310, to mapped IO requests 302, which specify writes to the object-file 160. As indicated, the object-file 160 is a file within file system 150 (a lower-deck file system). The object-file 160 has an inode structure 342 that stores information about the object-file 160. The inode structure 342 includes an inode as well as any indirect blocks (IBs) needed to address data 162 (FIG. 1) of the object-file 160.

File system 150 is seen to have a physical address range 320, which may be indexed, for example, by FSBN (file system block number), where FSBN ranges from zero to some large number. In the example shown, the physical address range 320 has various subspaces, shown here with references 320a through 320d, which are supported by respective sets of slices 350 served from the storage pool 232. Subspaces 320a through 320c are reserved for metadata 164, whereas subspace 320d is reserved for file data 162. In particular,

- Subspace 320a is reserved for inodes and is backed by slice 350a.
- Subspace 320b is reserved for indirect blocks (IBs) and is backed by slice 350b.
- Subspace 320c is reserved for VBMs (Virtual Block Maps) and is backed by slice 350c.
- Subspace 320d is reserved for file data (e.g., data 162) and is backed by slices 350e and 350f.

Although each subspace is seen to be supported by an illustrated number of slices, it is understood that each subspace may be supported by any number of slices. Also, the file system 150 may include different subspaces from those shown. The example is merely illustrative.

Slices 350 are derived from FLUs. The persistent metadata cache 170 supports the underlying FLUs for reads and writes, and includes sections 170a, 170b, and 170c, i.e., one section for each FLU (see also FIG. 1). Thus, FLU A is the source of slice 350a, which is supported for caching by section 170a. Similarly, FLU B and FLU C are the sources of slices 350b and 350c, which are supported for caching by sections 170b and 170c, respectively.

The file system 150 may operate a metadata manager 330. The metadata manager 330 orchestrates storage of metadata 164. For example, the metadata manager 330 performs the above-described acts of grouping together metadata changes into those that must be performed together, identifying blocks in the file system 150 that store the metadata to be changed, computing or otherwise obtaining FLU addresses for the identified blocks, and performing caching operations 152 to write to the persistent metadata cache 170.

When the data object 310 is a host file system, i.e., an upper-deck file system, the object-file 160 may store, within its data 162, both the data and the metadata of the host file system. The IO stack 140 maps both data and metadata at the upper deck to ordinary file data at the lower deck. Thus, any inodes, IBs, and other metadata structures that organize and describe the host file system map to data blocks, i.e., blocks within the subspace 320d in the file system 150.

Nevertheless, it is desirable to provide metadata caching for upper-deck file systems as well as for lower-deck file systems. To achieve this end, the general structure shown in FIG. 3, from the file system 150 to the FLUs, may be replicated at the upper deck, such that the host file system has its own pool, its own access to the persistent metadata cache 170, and its own FLU at the upper deck. The object-file 160 may form a single FLU at the upper deck. For example, the volume-file mapping 228 expresses an internal LUN 370, which higher levels of the IO stack 140 recognize as a FLU. This upper-deck FLU provides a source for upper-deck slices (not shown), which the host file system can provision into its physical address space, e.g., in the same manner as shown at the lower-deck.

The persistent metadata cache 170 provides caching services for the upper-deck FLU, e.g., the same way it does for the FLUs A, B, and C. The host file system has its own metadata manager 330, which performs caching operations, like the operations 152, for caching metadata changes into the persistent metadata cache 170 from the upper deck. Thus, metadata processing at the upper deck proceeds the same way as metadata processing at the lower deck, and the persistent metadata cache 170 can cache upper deck metadata even though such metadata appears as data at the lower deck.

Figure 4:
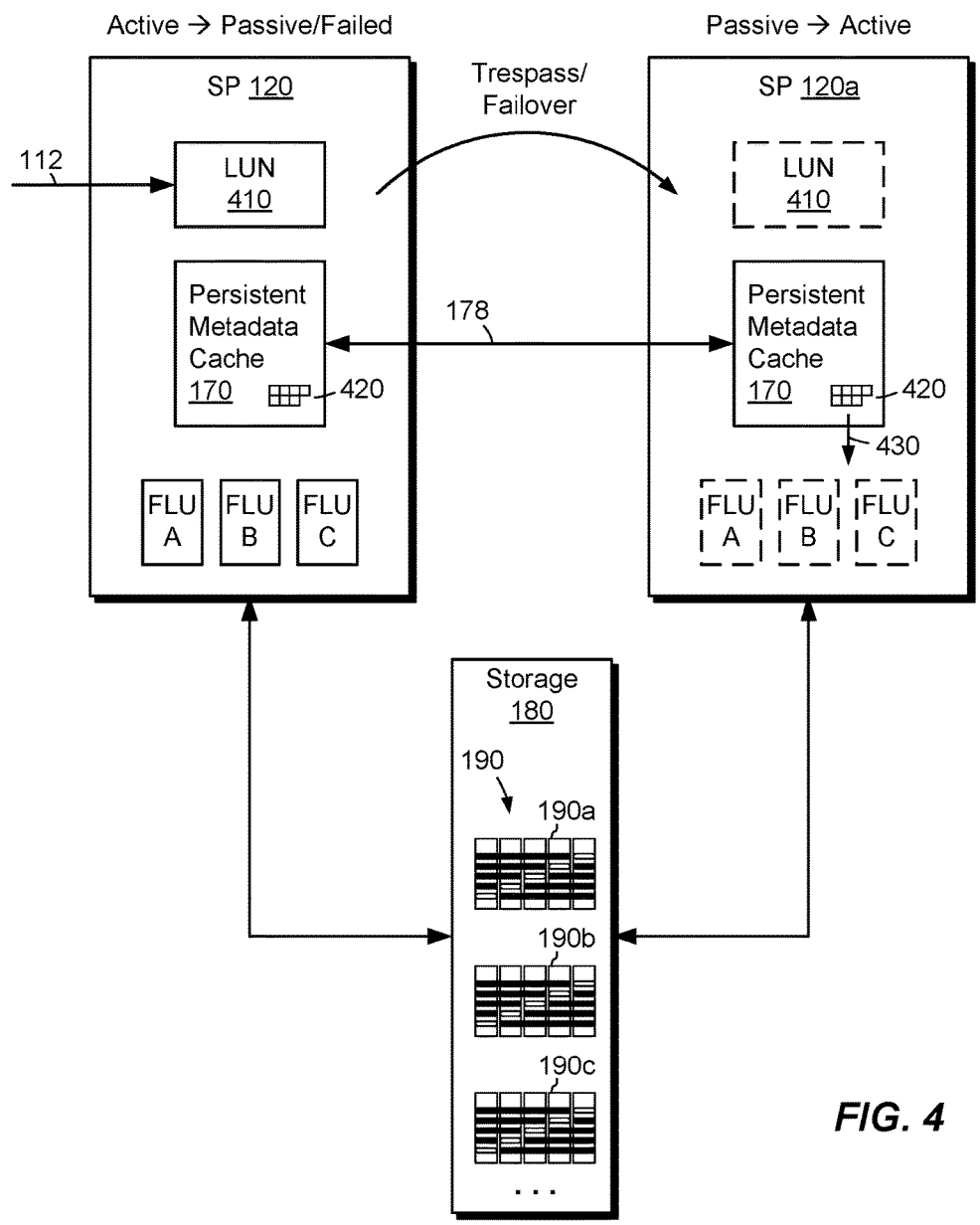
FIG. 4 is a block diagram showing an example arrangement for LUN trespass and/or failover between storage processors and resumption of metadata processing on the storage processor hosting the LUN after trespass and/or failover.

FIG. 4 shows an example arrangement for using the persistent metadata cache 170 to facilitate trespass and/or failover of a LUN 410 from SP 120 to SP 120a. In some examples, the LUN 410 is itself a host-accessible object, e.g., a data object 310 (FIG. 3). In other examples, the LUN 410 is an internal LUN, like the one provided by the LUN interface 370, which may support an upper-deck file system or other host-accessible data object.

In an initial state, SP 120 provides any of hosts 110(1) to 110(N) with access to LUN 410 for reading and writing. For example, the SP 120 may receive IO requests 112 specifying data to be written to the LUN 410. The SP 120 may respond by writing the specified data to data blocks of object-file 160 (FIG. 3) and by performing caching operations 152 to atomically store related metadata changes in the persistent metadata cache 170.

In the course of processing IO requests 112 directed to the LUN 410 by the SP 120, an event may occur that causes the LUN 410 to trespass to the SP 120a. For example, an administrator may manually direct the data storage system 116 to trespass the LUN 410 to the SP 120a, or the LUN 410 may trespass to SP 120a automatically. As is known, "trespassing" is the act of serving a LUN from an SP that is not the LUN's default owner. In this case, SP 120 is the default owner of the LUN 410, such that there is a trespass when the SP 120a hosts the LUN 410.

An instant before the trespass occurs, the persistent metadata cache 170 in the SP 120 may contain metadata changes 420 in pages that have not yet been flushed to one or more FLUs. However, since the persistent metadata cache 170 in SP 120 mirrors all metadata changes to the persistent metadata cache 170 in SP 120a, the same metadata changes 420 are already present in the persistent metadata cache 170 of the SP 120a when the trespass occurs.

Upon the occurrence of trespass, SP 120a takes over the hosting of LUN 410 and can pick up where SP 120 left off. For example, SP 120a may instantiate the FLUs A, B, and/or C from the RAID groups 190, if it has not already done so, and the persistent metadata cache 170 on SP 120a can perform flushing operation 430 to flush the metadata changes 420 to one or more of the FLUs.

Because the persistent metadata cache 170 is mirrored across SPs, the management of trespass becomes straightforward. For example, there is no need to sync or replay any transaction log. In addition, the flushing operation 430 need not be done with any urgency, as pages may remain in the persistent metadata cache 170 until they are flushed in the normal course of operation, e.g., when an LRU (least recently used) policy or some other cache policy causes them to be evicted. In the meantime, the cache pages are persistently and securely stored.

Failover from SP 120 to SP 120a works much the same way as trespass. In the failover scenario, however, SP 120 experiences a failure, which renders it unable to continue serving the LUN 410 to hosts. Based on a prearranged contingency, the service of the LUN 410 fails over to SP 120a. Upon failover, SP 120a instantiates the FLUs A, B, and/or C from the RAID group(s) 190, if they have not been instantiated already. SP 120 may have metadata changes 420 stored in its persistent metadata cache 170 that have not been flushed as of the time of the failure. However, SP 120a already has those same metadata changes 420 in its own persistent metadata cache 170, and it can thus resume processing the metadata changes in the usual course, e.g., by flushing them to one or more FLUs as a cache eviction policy requires.

Figure 5:
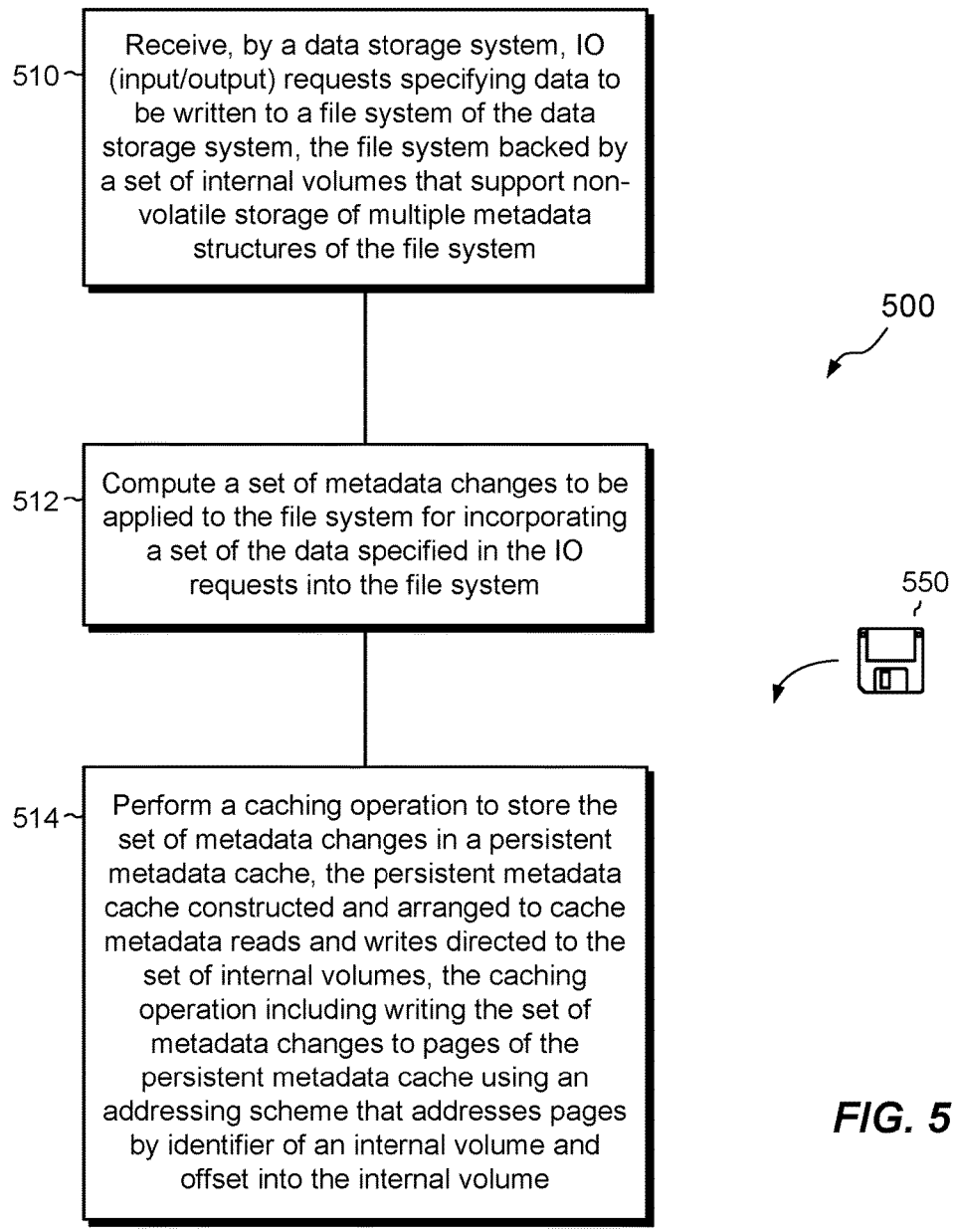
FIG. 5 is a flowchart showing an example process for storing metadata in a data storage system.

FIG. 5 shows an example process 500 for storing metadata in a data storage system and provides a summary of some of the material presented above. The process 500 may be carried out by the software constructs described in connection with FIGS. 1-3, which reside in the memory 130 of the storage processor 120 and are run by the set of processing units 124. The various acts of the process 500 may be ordered in any suitable way. Accordingly, embodiments may be constructed in which acts are performed in orders different from those illustrated, which may include performing some acts simultaneously, even though the acts are shown as sequential in the illustrated embodiments.

At 510, the data storage system receives IO (input/output) requests specifying data to be written to a file system of the data storage system. The file system is backed by a set of internal volumes that support non-volatile storage of multiple metadata structures of the file system. For example, the data storage system 116 receives IO requests 112 from any of hosts 110(1) to 110(N) specifying data to be written to a host-accessible data object (e.g., 310, FIG. 3), which is realized in an object-file 160 of file system 150. Through mapping of the IO stack 140, the IO requests 112 specify data to be written to the file system 150. The file system 150 is backed by internal volumes 174 (e.g., FLUs A, B, and C) that support non-volatile storage, e.g., in RAID groups 190 of metadata structures, such as inodes, indirect blocks, etc., of the file system 150.

At 512, a set of metadata changes to be applied to the file system are computed for incorporating a set of the data specified in the IO requests into the file system. For example, the metadata manager 330 (FIG. 3) computes metadata changes to be applied to the file system 150 for incorporating the data from the IO requests 112 into the file system 150, e.g., by allocating metadata blocks, changing block pointers, updating inodes, and so forth. In some examples, the metadata manager 330 groups together related metadata changes that must all be made together to keep the file system metadata in a consistent state.

At 514, a caching operation is performed to store the set of metadata changes in a persistent metadata cache. The persistent metadata cache is constructed and arranged to cache metadata reads and writes directed to the set of internal volumes. The caching operation includes writing the set of metadata changes to pages of the persistent metadata cache using an addressing scheme that addresses pages by identifier of an internal volume and offset into the internal volume. For example, the file system 150, by means of the metadata manager 330, performs a caching operation 152 to atomically store a group of metadata changes in the persistent metadata cache 170. The persistent metadata cache 170 operates as a read/write metadata cache for internal volumes 174 (e.g., FLUs). The caching operation 152 addresses pages in the persistent metadata cache 170, for example, by specifying the logical unit number of a FLU and an offset into the FLU.

An improved technique has been described for storing metadata changes in a data storage system. The technique includes caching metadata changes in a persistent metadata cache 170 configured to cache metadata reads and writes directed to a set of internal volumes (e.g., 174) of the data storage system 116. A file system 150 can access pages 178 of the persistent metadata cache 170 by specifying an identifier of an internal volume (e.g., FLU A, FLU B, or FLU C) and an offset into that volume to which the metadata changes are directed. Thus, for example, the persistent metadata cache 170 provides the file system 150 with persistent caching services without needing to copy metadata between different caches. Further, the persistent metadata cache 170 avoids the need to perform address translation when flushing metadata to internal volumes 174. As the persistent metadata cache 170 may be addressed using the same addressing scheme as is used for internal volumes 174, flushing 172 from persistent metadata cache 170 to underlying volumes 174 requires no additional mapping. The persistent metadata cache 170 thus reduces the number of operations required to accomplish routine metadata processing tasks and makes better use of data storage system resources.

Having described certain embodiments, numerous alternative embodiments or variations can be made. For example, although embodiments have been described in which the file system 150 is a lower-deck file system that stores an object-file 160 that is a container file, this is merely an example. Alternatively, the file system may be any type of file system, including a host-accessible file system that is not built upon any container file. In addition, the file system may be an upper-deck file system, e.g., as described in connection with FIG. 3.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of storing metadata in a data storage system, the method comprising:
    receiving, by a data storage system, IO (input/output) requests specifying data to be written to a file system of the data storage system, the file system backed by a set of internal volumes that support non-volatile storage of multiple metadata structures of the file system;
    computing a set of metadata changes to be applied to the file system for incorporating a set of the data specified in the IO requests into the file system; and
    performing a caching operation to store the set of metadata changes in a persistent metadata cache, the persistent metadata cache constructed and arranged to cache metadata reads and writes directed to the set of internal volumes, the caching operation including writing the set of metadata changes to pages of the persistent metadata cache using an addressing scheme that addresses pages by identifier of an internal volume and offset into the internal volume.

2. The method of claim 1, wherein the method further comprises flushing one of the set of pages to the same internal volume and offset to which the page was addressed in the persistent metadata cache when performing the caching operation.

3. The method of claim 2, wherein each of the set of internal volumes (i) operates as an interface for accessing a respective RAID (Redundant Array of Independent Disks) group of non-volatile storage devices and (ii) is addressed for accessing blocks in the RAID group using the same addressing scheme that persistent metadata cache uses for addressing pages in the persistent metadata cache.

4. The method of claim 2, wherein the set of metadata changes includes multiple metadata changes, and wherein performing the caching operation includes atomically committing the set of metadata changes to a set of pages in the persistent metadata cache such that all of the set of metadata changes are stored in the persistent metadata cache or none of them are.

5. The method of claim 4, wherein the persistent metadata cache is disposed at a first location in the data storage system, and wherein the method further comprises mirroring the set of metadata changes to a persistent metadata cache disposed at a second location in the data storage system.

6. The method of claim 5, further comprising the persistent metadata cache providing an acknowledgment that the caching operation has been completed successfully only after the set of metadata changes have been stored both in the persistent metadata cache disposed at the first location and in the persistent metadata cache disposed at the second location.

7. The method of claim 6, wherein the first location is on a first storage processor of the data storage system and the second location is on a second storage processor of the data storage system.

8. The method of claim 7, wherein the file system includes a container file, the container file storing a file-based realization of a LUN (Logical Unit Number), wherein the IO requests are directed to the LUN and received by the first storage processor, wherein performing the caching operation includes (i) storing the set of metadata changes in the persistent metadata cache on the first storage processor and (ii) mirroring the set of metadata changes to the persistent metadata cache on the second storage processor, and wherein the method further comprises:
    trespassing the LUN from the first storage processor to the second storage processor; and
    completing the IO requests on the second storage processor, including flushing, by the second storage processor, at least a portion of the set of metadata changes from the persistent metadata cache on the second storage processor to at least one of the set of internal volumes.

9. The method of claim 7, wherein the file system includes a container file, the container file storing a file-based realization of a LUN (Logical Unit Number), wherein the IO requests are directed to the LUN, wherein the IO requests are received by the first storage processor, wherein performing the caching operation includes (i) storing the set of metadata changes in the persistent metadata cache on the first storage processor and (ii) mirroring the set of metadata changes to the persistent metadata cache on the second storage processor, and wherein the method further comprises:
    upon a failure occurring at the first storage processor, failing over service of the LUN from the first storage processor to the second storage processor; and
    completing the IO requests on the second storage processor, including flushing, by the second storage processor, at least a portion of the set of metadata changes from the persistent metadata cache on the second storage processor to at least one of the set of internal volumes.

10. The method of claim 7, wherein the persistent metadata cache on the first storage processor and the persistent metadata cache on the second storage processor are each implemented in DRAM (Dynamic Random Access Memory), and wherein the method further comprises backing up power for maintaining operation of the DRAM on the first storage processor and the second storage processor with a set of batteries.

11. A data storage system, comprising a set of processing units and memory, the memory coupled to the set of processing units and storing executable instructions which, when executed by the set of processing units, cause the set of processing units to:
    receive, by the data storage system, IO (input/output) requests specifying data to be written to a file system of the data storage system, the file system backed by a set of internal volumes that support non-volatile storage of multiple metadata structures of the file system;
    compute a set of metadata changes to be applied to the file system for incorporating a set of the data specified in the IO requests into the file system; and
    perform a caching operation to store the set of metadata changes in a persistent metadata cache, the persistent metadata cache constructed and arranged to cache metadata reads and writes directed to the set of internal volumes, the caching operation including writing the set of metadata changes to pages of the persistent metadata cache using an addressing scheme that addresses pages by identifier of an internal volume and offset into the internal volume.

12. The data storage system of claim 11,
wherein the set of metadata changes includes multiple metadata changes,
wherein performing the caching operation includes atomically committing the set of metadata changes to a set of pages in the persistent metadata cache such that all of the set of metadata changes are stored in the persistent metadata cache or none of them are, and
wherein the set of instructions further cause the set of processing units to flush one of the set of pages to the same internal volume and offset to which the page was addressed in the persistent metadata cache when performing the caching operation.

13. The data storage system of claim 11, wherein each of the set of internal volumes (i) operates as an interface for accessing a respective RAID (Redundant Array of Independent Disks) group of non-volatile storage devices and (ii) is addressed for accessing blocks in the RAID group using the same addressing scheme that persistent metadata cache uses for addressing pages in the persistent metadata cache.

14. The data storage system of claim 13, wherein the persistent metadata cache on the first storage processor and the persistent metadata cache on the second storage processor are each implemented in DRAM (Dynamic Random Access Memory), and wherein the data storage system further comprises a set of batteries coupled to the DRAM on the first storage processor and to the DRAM on the second storage processor to provide back up power for the DRAM.

15. A non-transitory, computer-readable medium including instructions which, when executed by a set of processing units of a data storage system, cause the set of processing units to perform a method of storing metadata in a data storage system, the method comprising:
receiving, by the data storage system, IO (input/output) requests specifying data to be written to a file system of the data storage system, the file system backed by a set of internal volumes that support non-volatile storage of multiple metadata structures of the file system;
computing a set of metadata changes to be applied to the file system for incorporating a set of the data specified in the IO requests into the file system; and
performing a caching operation to store the set of metadata changes in a persistent metadata cache, the persistent metadata cache constructed and arranged to cache metadata reads and writes directed to the set of internal volumes, the caching operation including writing the set of metadata changes to pages of the persistent metadata cache using an addressing scheme that addresses pages by identifier of an internal volume and offset into the internal volume.

16. The non-transitory, computer-readable medium of claim 15,
wherein the method further comprises flushing one of the set of pages to the same internal volume and offset to which the page was addressed in the persistent metadata cache when performing the caching operation,
wherein each of the set of internal volumes (i) operates as an interface for accessing a respective RAID (Redundant Array of Independent Disks) group of non-volatile storage devices and (ii) is addressed for accessing blocks in the RAID group using the same addressing scheme that persistent metadata cache uses for addressing pages in the persistent metadata cache.

17. The non-transitory, computer-readable medium of claim 16, wherein the set of metadata changes includes multiple metadata changes, and wherein performing the caching operation includes atomically committing the set of metadata changes to a set of pages in the persistent metadata cache such that all of the set of metadata changes are stored in the persistent metadata cache or none of them are.

18. The non-transitory, computer-readable medium of claim 17, wherein the persistent metadata cache is disposed at a first location in the data storage system, and wherein the method further comprises:
mirroring the set of metadata changes to a persistent metadata cache disposed at a second location in the data storage system;
providing, by the persistent metadata cache, an acknowledgment that the caching operation has been completed successfully only after the set of metadata have been stored both in the persistent metadata cache disposed at the first location and in the persistent metadata cache disposed at the second location.

19. The non-transitory, computer-readable medium of claim 18, wherein the first location is on a first storage processor of the data storage system and the second location is on a second storage processor of the data storage system, wherein the file system includes a container file, the container file storing a file-based realization of a LUN (Logical Unit Number), wherein the IO requests are directed to the LUN and received by the first storage processor, wherein performing the caching operation includes (i) storing the set of metadata changes in the persistent metadata cache on the first storage processor and (ii) mirroring the set of metadata changes to the persistent metadata cache on the second storage processor, and wherein the method further comprises:
trespassing the LUN from the first storage processor to the second storage processor; and
completing the IO requests on the second storage processor, including flushing, by the second storage processor, at least a portion of the set of metadata changes from the persistent metadata cache on the second storage processor to at least one of the set of internal volumes.

20. The non-transitory, computer-readable medium of claim 18, wherein the first location is on a first storage processor of the data storage system and the second location is on a second storage processor of the data storage system, wherein the file system includes a container file, the container file storing a file-based realization of a LUN (Logical Unit Number), wherein the IO requests are directed to the LUN and received by the first storage processor, wherein performing the caching operation includes (i) storing the set of metadata changes in the persistent metadata cache on the first storage processor and (ii) mirroring the set of metadata changes to the persistent metadata cache on the second storage processor, and wherein the method further comprises:
upon a failure occurring at the first storage processor, failing over service of the user LUN from the first storage processor to the second storage processor; and
completing the IO requests on the second storage processor, including flushing, by the second storage processor, at least a portion of the set of metadata changes from the persistent metadata cache on the second storage processor to at least one of the set of internal volumes.

* * * * *